United States Patent
Bailer et al.

(10) Patent No.: US 6,264,531 B1
(45) Date of Patent: Jul. 24, 2001

(54) MACHINE FOR MACHINING WORK PIECES WITH CUTTING TEETH, ESPECIALLY SAW BLADES

(75) Inventors: Norbert Bailer, Schemmerhofen-Altheim; Peter Lenard, Biberach, both of (DE)

(73) Assignee: Vollmer Werke Maschinenfabrik GmbH, Riss (DE)

( * ) Notice: Subject to any disclaimer, the term of this patent is extended or adjusted under 35 U.S.C. 154(b) by 0 days.

(21) Appl. No.: 09/509,277

(22) PCT Filed: Nov. 2, 1998

(86) PCT No.: PCT/EP98/06916

§ 371 Date: Mar. 27, 2000

§ 102(e) Date: Mar. 27, 2000

(87) PCT Pub. No.: WO99/22898

PCT Pub. Date: May 14, 1999

(30) Foreign Application Priority Data

Nov. 4, 1997 (DE) .............................................. 197 48 673

(51) Int. Cl.$^7$ .................................................. B24B 49/00
(52) U.S. Cl. .................................. 451/5; 451/47; 451/8; 451/45
(58) Field of Search .............................. 451/5, 8, 9, 10, 451/11, 45, 56, 57, 177, 178, 193, 443, 444

(56) References Cited

U.S. PATENT DOCUMENTS

| | | | |
|---|---|---|---|
| 3,640,030 | * | 2/1972 | Clarke et al. ......................... 451/47 |
| 4,172,343 | * | 10/1979 | Sakcriska ............................ 451/45 |
| 4,461,121 | * | 7/1984 | Motzer et al. ......................... 451/5 |
| 4,712,332 | * | 12/1987 | Smith ................................. 451/5 |
| 4,837,983 | * | 6/1989 | Fuller ................................. 451/8 |
| 4,905,418 | * | 3/1990 | Wedeniwski ........................... 451/5 |
| 4,963,710 | | 10/1990 | Lach . |

FOREIGN PATENT DOCUMENTS

| | | |
|---|---|---|
| 27 51 408 A1 | 5/1979 | (DE) . |
| WO 92/19406 | 11/1992 | (WO) . |

* cited by examiner

Primary Examiner—Derris H. Banks
Assistant Examiner—Daniel Shanley
(74) Attorney, Agent, or Firm—Clifford W. Browning; Woodard, Emhardt, Naughton, Moriarty & McNett

(57) ABSTRACT

A tool head (46) in which a tool spindle (52), adapted to be equipped with a disc-shaped tool (100), is supported so as to be driven in rotation about a spindle axis (C), is associated with a workpiece support (82) on which a workpiece (10) can be arranged such that the tooth tip (18) of a cutting tooth (12) to be machined will lie on a stationary reference axis (A). The tool head (46) is movably supported by means of a reciprocating slide (34) which is movable back and forth along a reciprocating slide guide means (32) transversely of the reference axis (A), by means of a feed slide (24) adapted to be advanced along a feed slide guide means (22) transversely of the reciprocating slide guide means (32), and by a pivot bearing means (42) defining a pivot axis (B) parallel to the reciprocating slide guide means (32). The tool head (46) is pivotable about the pivot axis (B) by a pivot drive means (60) from a normal position for machining surfaces of the cutting teeth (12) which extend parallel to the reference axis (A) into inclined positions for machining oblique surfaces of the cutting teeth (12). The distance (x) by which the active face (106) of the tool (100) is spaced from the pivot axis (B) can be measured by a measuring means (108). A numerical control means (98) makes sure that the feed slide (24) adopts a position at which the spacing of the pivot axis (B) from the reference axis (A) equals the distance (x) when the tool head (46) is in the normal position, and that the feed slide (24) adopts a respective corrected position when the tool head (46) is in an inclined position.

6 Claims, 6 Drawing Sheets

$$y = \frac{x}{\cos \alpha}$$

$$z = y - x = (1/\cos \alpha - 1)$$

US 6,264,531 B1

MACHINE FOR MACHINING WORK PIECES WITH CUTTING TEETH, ESPECIALLY SAW BLADES

FIELD OF THE PRESENT INVENTION

The invention relates to a machine as defined in the preamble of claim 1.

BACKGROUND OF THE INVENTION

In a known machine of this kind (DE 27 51 408 A1) the reference axis is defined by a rocker bearing which is disposed on the machine bed and supports a radially projecting beam. The beam is formed with a reciprocating slide guide means along which a reciprocating slide is displaceable radially with respect to the reference axis. A pivot bearing means on the reciprocating slide defines a pivot axis which extends parallel to the reciprocating slide guide means and intersects the reference axis at a right angle. A shaft, with a spindle head secured to it, is supported in the pivot bearing means. Inside the spindle head, a spindle sleeve is guided so as to be displaced by means of a feed drive along a grinding spindle axis which intersects the pivot axis at a right angle. The spindle sleeve, which thus corresponds to a feed slide, includes a grinding spindle adapted to be driven in rotation and carrying a plate-shaped grinding disc for sharpening the toothing of a circular saw blade. When straight surfaces at the front of teeth (cutting faces) or straight surfaces at the back of teeth (clearance faces) are to be sharpened the spindle sleeve always is adjusted by the feed drive in such a way that the active front surface of the grinding disc will lie in a plane which contains the reference axis. For the grinding of oblique surfaces, the spindle head is swung about the pivot axis in one or the other direction, depending on the direction of the inclination. To accomplish that, a cross bar is fastened to that end of the shaft carrying the spindle head which is remote from the spindle head, and two rolls are supported so as to be freely rotatable on this cross bar at equal distances from the pivot axis and diametrically opposed with respect to the latter. These two rolls are arranged between a piston and cylinder unit each and an adjustable stop each in such a way that the cross bar and, together with it, the shaft carrying both the cross bar and the spindle head are swingable back and forth within a pivot range which is limited by the stops. The inert masses thus to be moved are considerable indeed because the spindle sleeve and its feed drive take part in the pivoting motion. Consequently the pivoting frequency to be achieved with back and forth swinging movements is limited.

SUMMARY OF THE PRESENT INVENTION

It is the object of the invention to improve a machine for machining workpieces which have cutting teeth, especially saw blades, such that it can operate faster than the known machine described when machining surfaces at the front or back of teeth which are oblique in alternating directions or chamfers.

The object is met, in accordance with the invention, by the features of claim 1. Advantageous further developments are the subject matter of the subclaims.

The principle which has been essential so far for the design of machinery for sharpening the serration of saws according to which the active face of the tool had to be disposed such as to be touched by the pivot axis of the tool head, which pivot axis intersected the reference axis of the machine, is given up in accordance with the invention.

According to the invention, neither the feed slide nor the reciprocating slide take part in pivoting movements of the tool head about the pivot axis. As a result, the inert mass affected by the swinging motions is only relatively small and for this reason the pivoting can be effected at high speed.

The pivot axis may be located at a distance in the order of up to about one tenth of the tool diameter from the active face of the tool, especially from the active front surface of a plate or cup-shaped tool. The influence of this distance on the machining geometry can be compensated by measures according to the invention in such a way that, once the cutting teeth are finished, it cannot be determined whether they were machined with the machine according to the invention or a known machine. Machining, in the first place, is to be understood as referring to the removal of material by grinding, but also by spark erosion in cases suitable for such work. Accordingly, the tool to be fastened on the tool spindle may be a grinding disc or an erosion disc.

BRIEF DESCRIPTION OF THE DRAWINGS

An embodiment of the invention will be described in greater detail below with reference to diagrammatic drawings, in which.

DETAILED DESCRIPTION OF THE PREFERRED EMBODIMENTS

Figure 1:
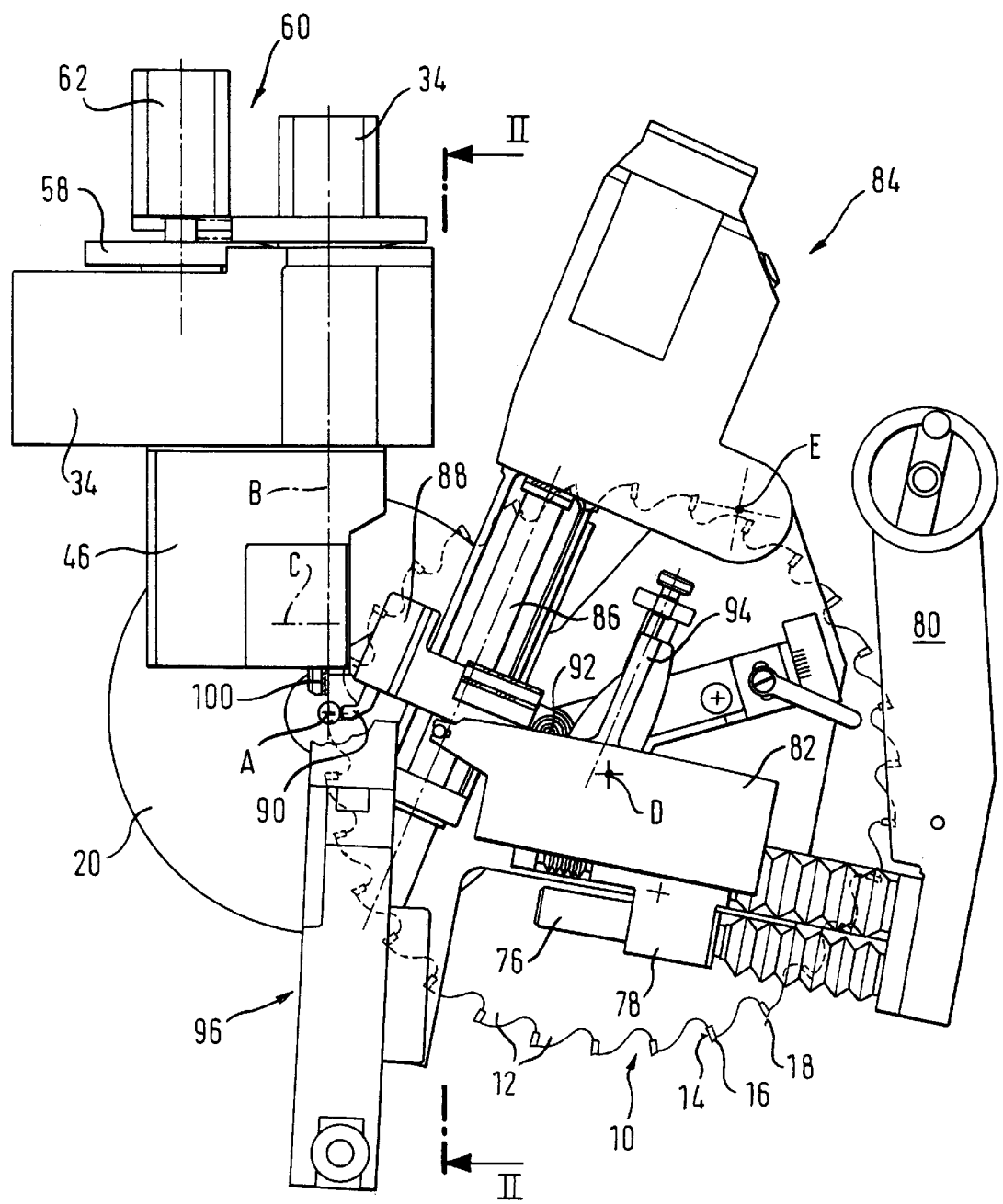
FIG. 1 is a front elevation of a machine for sharpening circular saw blades.
Figure 2:
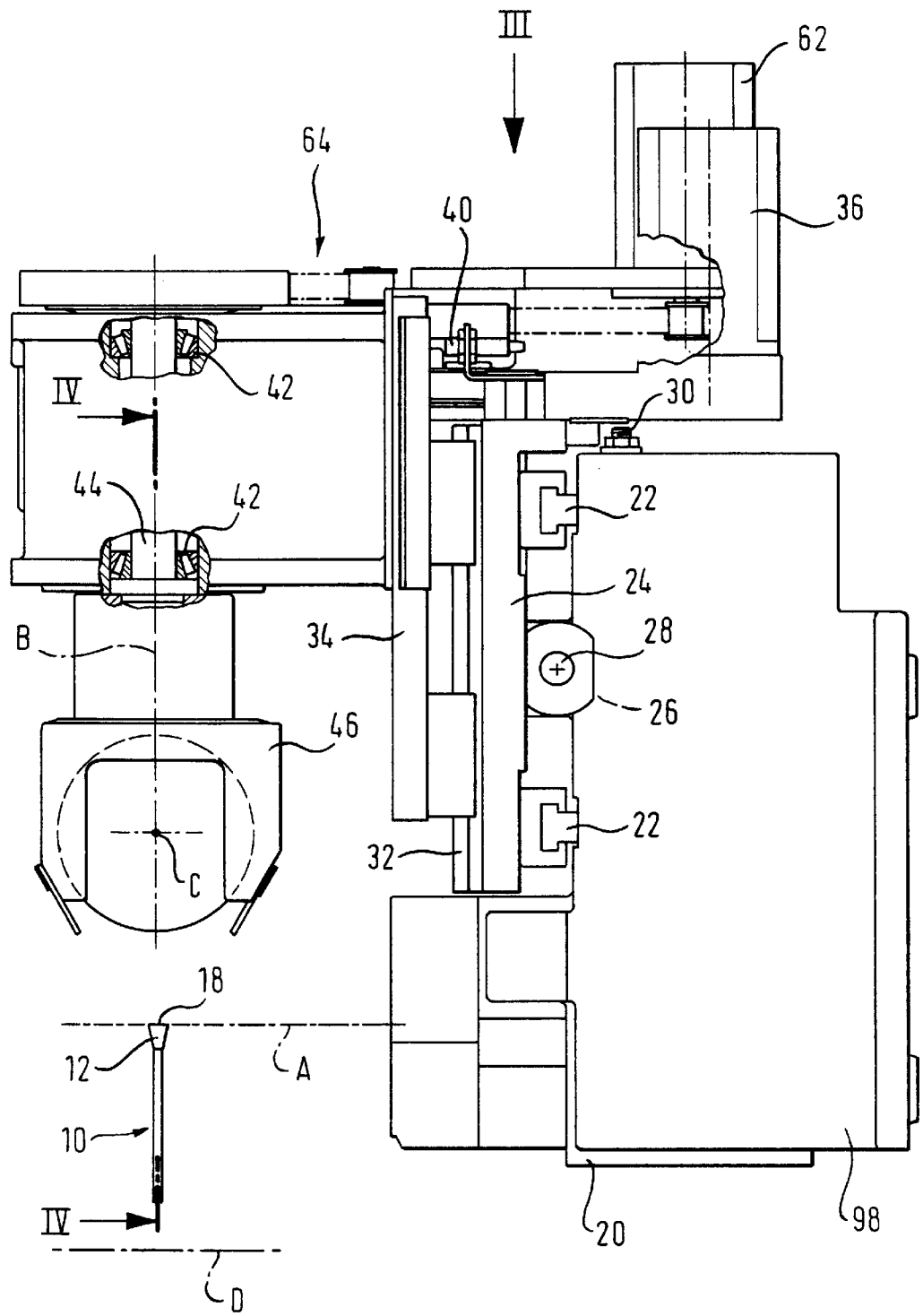
FIG. 2 is the view as seen in the direction of arrow II in FIG. 1.
Figure 3:
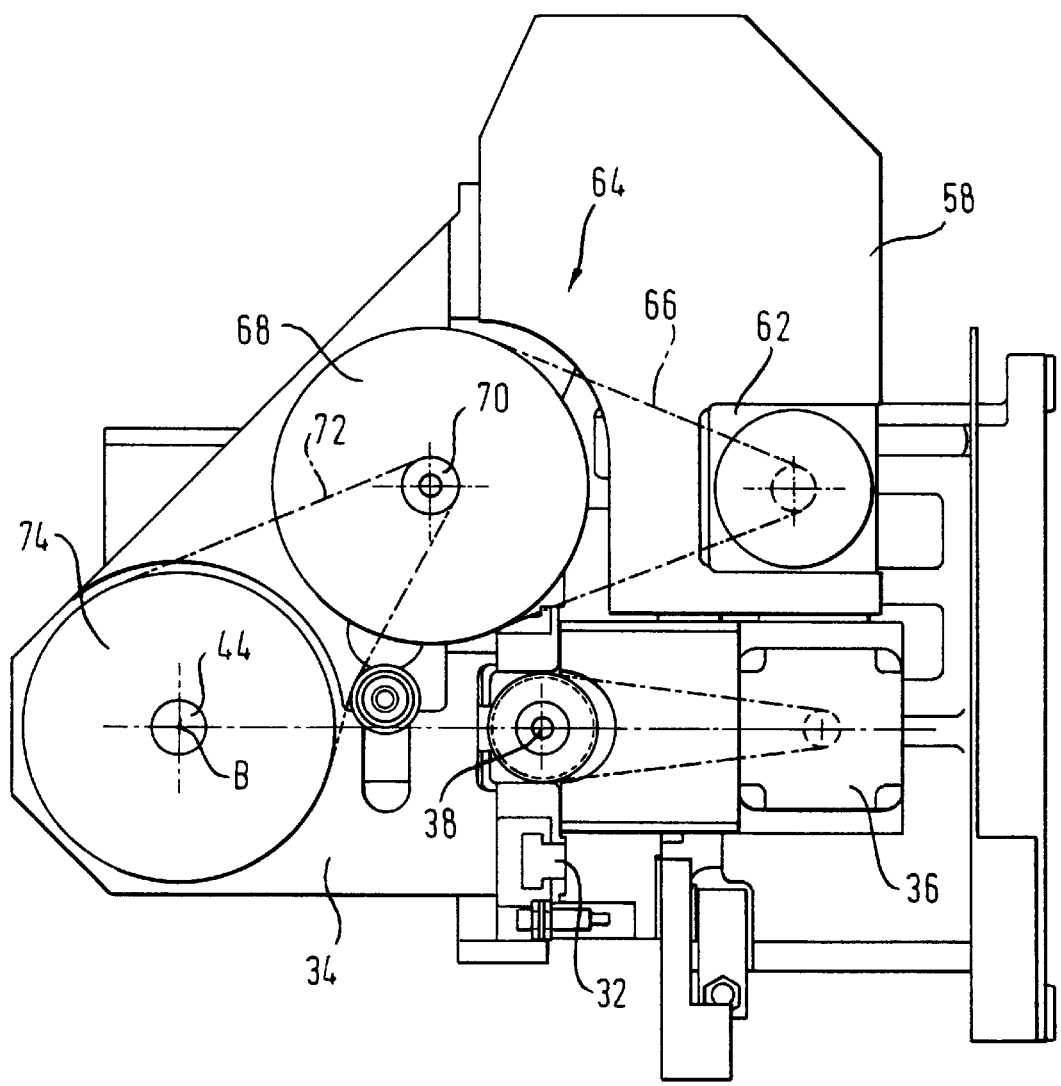
FIG. 3 is the top plan view as seen in the direction of arrow III in FIG. 2.

The example shown of a workpiece 10 to be machined on the machine illustrated is a circular saw blade having hard metal trimmed cutting teeth 12, each to be machined at its tooth face 14 and its tooth back 16 while its tooth tip 18 is located in a predetermined position on a stationary reference axis A of the machine.

The machine illustrated comprises a machine bed 20 and, on the same, a stationary horizontal feed slide guide means 22 along which a feed slide 24 is guided by means of a numerically controlled electric motor 26, especially a servo motor or a stepping motor, so as to be displaced by a feed spindle 28. The respective position of the feed slide 24 is monitored by a distance measuring means 30.

A vertical reciprocating slide guide means 32 is disposed at the feed slide 24, and a reciprocating slide 34 is movable up and down along said guide means by a numerically controlled electric motor 36, especially a servor motor or a stepping motor, via a lift spindle 38, while being monitored by a distance measuring means 40. The reciprocating slide 34 has a built-in pivot bearing means 42 which defines a pivot axis B in parallel with the reciprocating slide guide means 32, i.e. a vertical pivot axis in the embodiment shown. The pivot axis B is the axis of a pivot shaft 44 which is supported in the pivot bearing means 42 and carries a tool head 46 fastened to its lower end.

A bearing box 50 is secured in the tool head 46 in electrically insulated manner through an insulation sleeve 48 and defines a spindle axis C which is horizontal in the embodiment shown and intersects the pivot axis B at right angles. This is the axis of a tool spindle 52 which is supported in the bearing box 50 and connected to a motor 56 by a belt drive means 54. The motor 56 is embodied by an electric motor fed by a frequency converter such that the tool spindle 52 can be driven at rotational speeds which are variable within wide limits.

The reciprocating slide 34 has an upper projecting arm 58 on which a pivot drive means 60 is mounted to swing the tool head 46. The pivot drive means 60 comprises a numerically controlled motor 62, especially a servo motor or stepping motor, and stepdown gearing 64 with a first toothed belt 66 which interconnects the shaft of the motor 62 and an intermediate gear 68 supported by the projecting arm 58, and further with an intermediate pinion 70 which is firmly connected to the intermediate gear 68 and linked by a second toothed belt 72 to a gear 74 fixed on the pivot shaft 44.

The pivot drive means 60 is adjusted, under program control, such that the tool head 46 will be in its normal position, illustrated in FIGS. 1 to 5, at which the spindle axis C extends perpendicularly to the reference axis A, when a straight tooth face 14 or a straight tooth back 16 are to be ground. The tool head 46 can be swung by the pivot drive means 60, under program control, into inclined positions towards either side from its normal position in order to sharpen cutting teeth 12 with an oblique tooth face 14 or an oblique tooth back 16 or in order to chamfer the edges between a tooth back 16 and lateral flanks of a cutting tooth 12.

Figure 6:
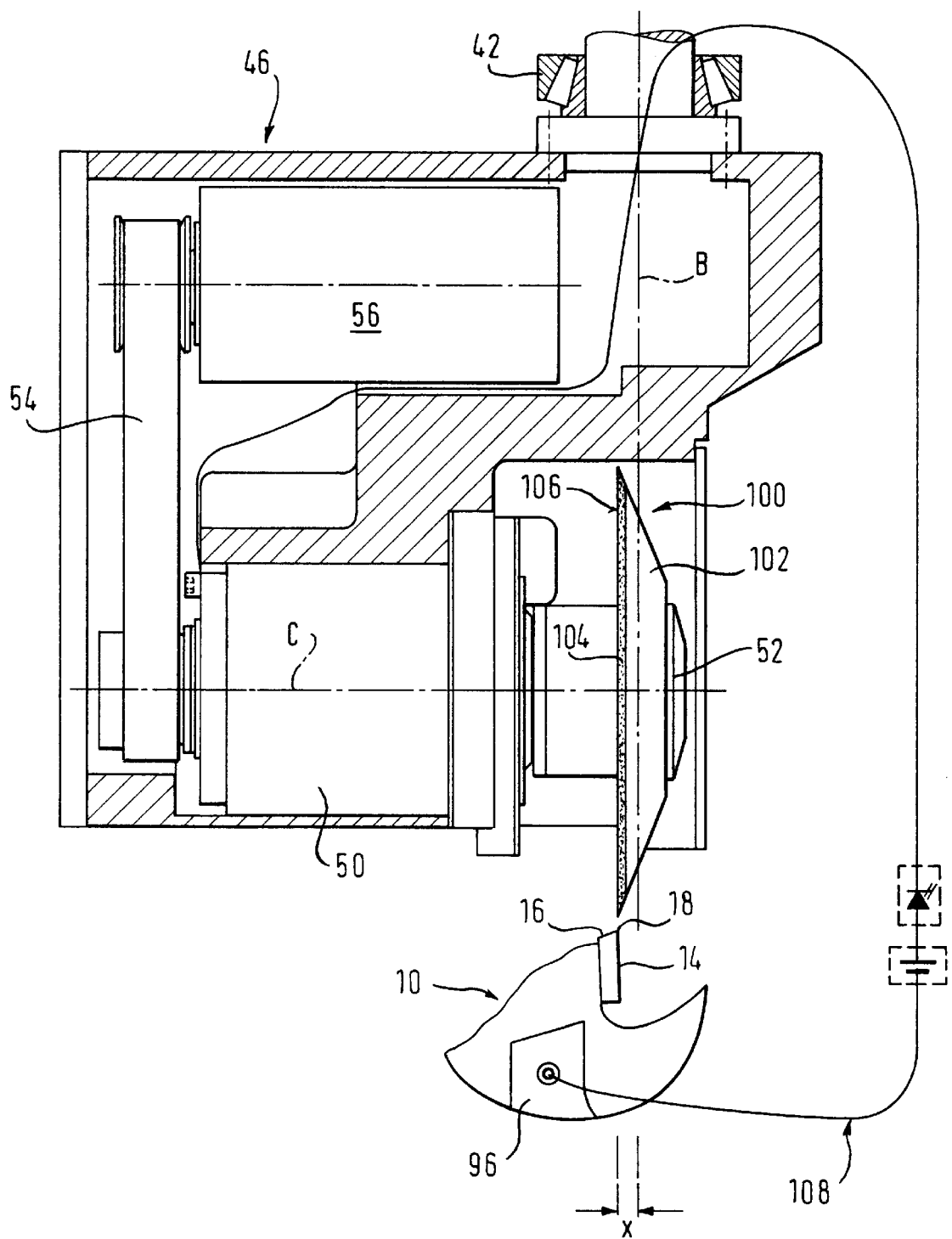
FIG. 6 shows a modification of FIG. 4.

A workpiece slide guide means 76 is supported on the machine bed 20 for pivoting movements about the reference axis A and can be set at a position which corresponds to the clearance angle or the cutting angle of the cutting teeth 12, depending on whether the latter are to be machined at their tooth back 16 (FIG. 4) or their tooth face 14 (FIG. 6). The workpiece slide guide means 76 guides a workpiece slide 78 which is adjustable by an adjusting device 80, operated manually in the embodiment shown, and includes a workpiece support 82 for a workpiece 10. Since the workpiece 10 is a circular saw blade in the embodiment illustrated the workpiece support 82 comprises a peg, as usual, on which the workpiece 10 is donned so as to be rotatable about its workpiece axis of rotation D in order to be pushed forward in stepwise fashion such that after each step a machining position will be reached at which the tooth tip 18 of one of the cutting teeth 12 is located on the reference axis A.

An advance means 84 is provided to effect those forward movements. This means is supported on the machine bed so as to be pivotable about a bearing axis E parallel to the reference axis A, and it comprises an advancing slide guide means 86 which is disposed at right angles to the reference axis A and along which an advancing slide 88 is guided for back and forth movement. The advancing slide 88 carries an advance finger 90 for engagement with a respective tooth face 14 each in order to push t e corresponding cutting tooth 12 into its position for machining. The advancing slide 88 carries a cam follower 92 by which it rests on a cam surface of an eccentric member 94 mounted on the machine bed 20 in pivotably adjustable fashion. Details of this arrangement are to be gathered from patent application 197 46 232 of Oct. 20, 1997.

A clamping device 96 of conventional design is provided to clamp the workpiece 10 after each incremental movement.

The motor 26 and the distance measuring means 30 for the feed slide 24, the motor 36 and the distance measuring means 40 for the reciprocating slide 34, and the motor 62 and an angle measuring means (not shown) for the pivoting adjustments of the tool head 46 about the pivot axis B all are connected to a numerical control means 98.

The example shown of a tool 100 to be fastened on the tool spindle 52 of the machine illustrated either is a cup-shaped grinding disc for grinding the cutting teeth 12 at their tooth back 16 (FIGS. 1, 4, and 5) or a plate-shaped grinding disc for grinding the cutting teeth 12 at their tooth face 14 (FIG. 6). In both instances the tool 100 comprises a base 102 made of steel and a grinding layer 104 which is secured to the base and the free front surface of which presents the active face 106 of the tool 100. The grinding layer 104 contains electrically conductive material. The tool 100 thus being electrically conductive on the whole, forms part of a measuring means 108 indicated in FIG. 6 including an electric circuit which is closed through the tool 100 and the respective cutting tooth 12 to be machined when the two contact each other.

The machining position of the cutting tooth 12 is known either as a result of manual adjustment of the workpiece 10 by means of the adjusting device 80 or by program controlled sensing and adjusting in accordance with DE 196 30 057 C1. Thus it may be assumed that the tooth tip 18 of the cutting tooth 12 to be machined is located on the reference axis A. The numerical control means 98 then causes the reciprocating slide 34 to carry out several operating strokes in order to determine the location of the active face 106 of the tool 100 as that varies in the course of wear. During those operating strokes, the active face 106 of the tool 100 first is at a safe spacing from the tooth back 16 (FIG. 4) or the tooth face 14 (FIG. 6) of the workpiece 10 and 6 meanwhile the feed slide 24 is slowly advanced until the tool 100, by its active face 106, touches the tooth back 16 or the tooth face 14, whereby the electric circuit of the measuring means 108 is closed. The position of the feed slide 24 at which that happens is determined by the distance measuring means 30. The position of the pivot axis B with respect to any desired zero point of the distance measuring means 30 is known from the beginning. The numerical control means 98, therefore, now can calculate the distance x between the pivot axis B and the active tool face 106 in its instantaneous state of wear.

If it is a straight tooth face 14, i.e. a tooth face in parallel with the reference axis A, or a straight tooth back 16 which is to be machined, no further calculating operations are required, apart from the fact that the tool 100 is moved forward by the feed slide 24 in the usual manner by an amount commensurate with that which is to be removed from the tooth face 14 or the tooth back 16.

However, when a tooth face 14 or a tooth back 16 is oblique, being inclined at an angle α with respect to the workpiece axis D, it is not sufficient to swing the tool head 46 accordingly about the pivot axis B. What is needed in addition is an infeed z of the feed slide 24 adapted to the distance x as measured and the angle of inclination α of the tool head. This infeed z is calculated by the numerical control means 98 in accordance with the geometrical relationships illustrated in FIG. 5, applying the following formula $$z = y - x = x(1/\cos\alpha - 1).$$

Figure 4:
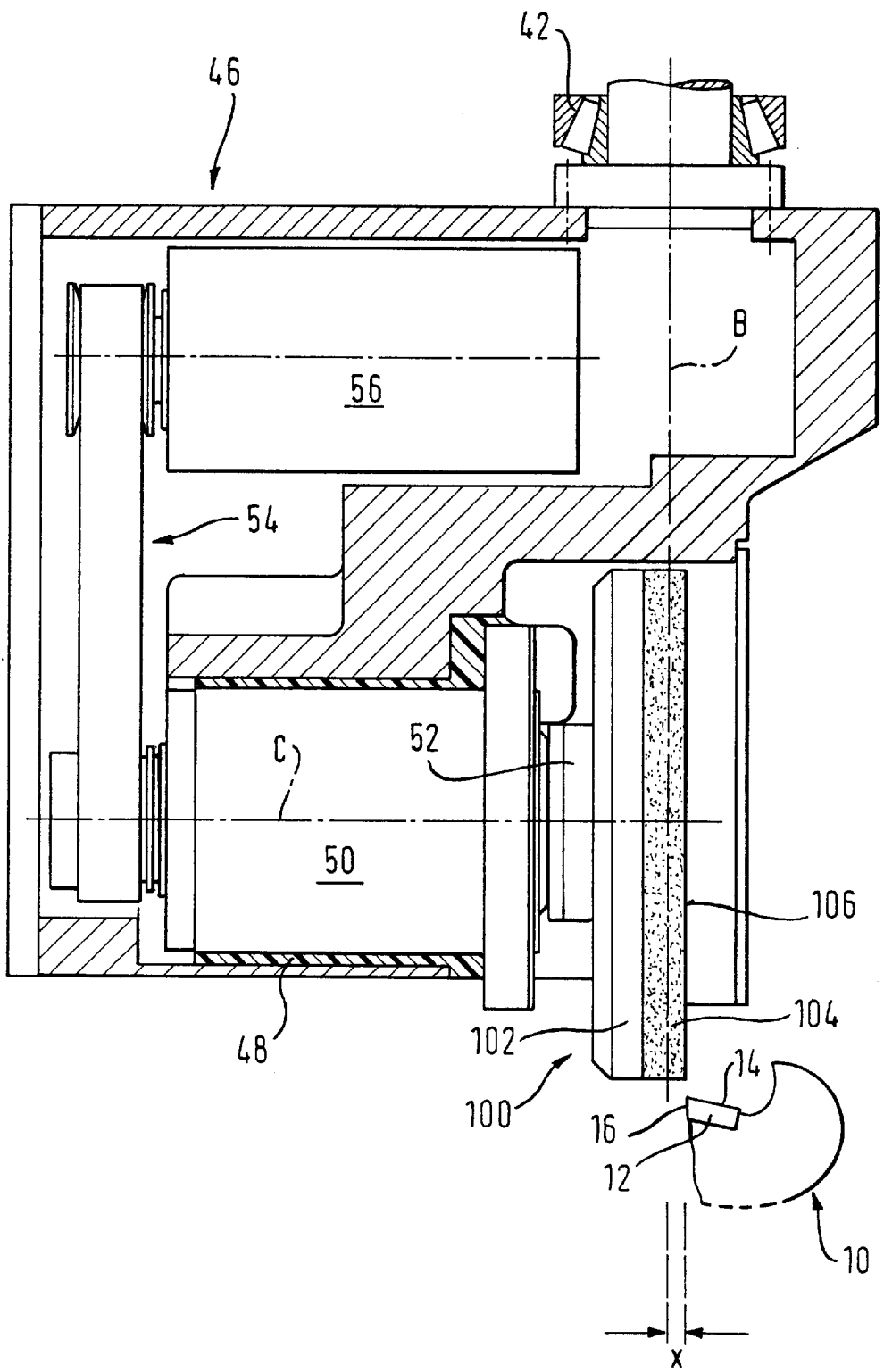
FIG. 4 is the sectional elevation IV—IV in FIG. 2.
Figure 5:
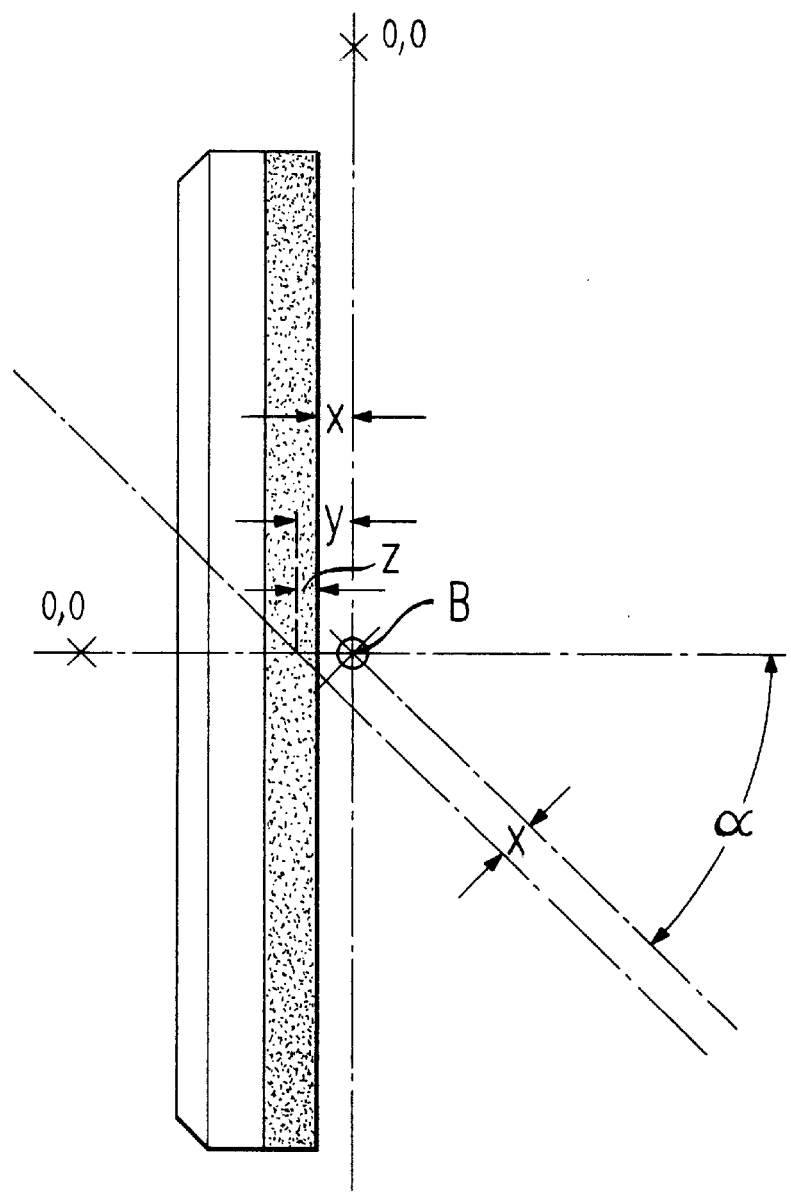
FIG. 5 shows an enlarged cutout of FIG. 4.

The infeed z is a negative amount when the distance x is positive, as illustrated in FIGS. 4 and 6.

The amount x gradually decreases as the wear of the tool 100 increases. But in the case of the tool 100 shown in FIG. 6 the distance x remains positive until the grinding layer 104 is completely worn because the pivot axis B extends through the base 102. The situation is different with the tool 100 shown in FIGS. 4 and 5 where the pivot axis B extends between the base 102 and the active face 106 when the grinding layer 104 is new. Consequently the distance x becomes reduced with increasing wear of the grinding layer 104 according to FIG. 4 down to zero and, as the wear goes on, its value becomes negative and that requires positive infeed for machining oblique tooth backs 16.

Negative infeed is needed also when a cutting tooth 12, having had its tooth back 16 ground, is to be given a chamfer i.e. to receive a bevel grind of limited width each at the transitions from its tooth back 16 to either of its lateral flanks.

What is claimed is:

1. A machine for machining workpieces (10) having cutting teeth (12), especially saw blades, comprising a machine bed (20) which defines a reference axis (A), a workpiece support (82) on which a workpiece (10) can be arranged such that the tooth tip (18) of a cutting tooth (12) to be machined will lie on the reference axis (A), a tool head (46) in which a tool spindle (52) adapted to be equipped with a disc-shaped tool (100) is supported so as to be driven in rotation about a spindle axis (C), and an assembly for movably supporting the tool head (46) on the machine bed (20) which assembly comprises a reciprocating slide (34) movable back and forth along a reciprocating slide guide means (32) transversely of the reference axis (A), a feed slide (24) adapted to be advanced along a feed slide guide means (22) transversely of the reciprocating slide guide means (32), and a pivot bearing means (42) defining a pivot axis (B) parallel to the reciprocating slide guide means (32) about which axis the tool head (46) is pivotable by a pivot drive means (60), with respect to the reciprocating slide (34) and the guide means (32) thereof, from a normal position at which surfaces of the cutting teeth (12) extending parallel to the reference axis (A) are to be machined by means of an active face (106) of the tool (100), into inclined positions at which oblique surfaces of the cutting teeth (12) are to be machined by means of the same active face (106) of the tool (100), and further comprising a numerical control means (98) by which at least the feed slide (24) is controllable, characterized in that, the tool head (46) is pivotable by the pivot bearing (42) also with respect to the feed slide (24) and the guide means (22) thereof, a measuring means (108) is provided to measure a distance (x) by which the active face (106) of the tool (100) is spaced from the pivot axis (B), and the numerical control means (98) is programmable such that it causes the feed slide (24) to adopt a position at which the spacing of the pivot axis (B) from the reference axis (A) equals the distance (x) when the tool head (46) is in the normal position, and it moves the feed slide (24) into a respective corrected position when the tool head (46) is positioned at an inclination.

2. The machine as claimed in claim 1, characterized in that the measuring means (108) comprises an electric circuit which is closed through the tool (100) and the workpiece (10) when the two touch each other.

3. The machine as claimed in claim 2, characterized in that the tool (100), being part of the measuring means (108), is adapted to be driven at a rotational measuring speed which is considerably slower than the rotational operating speed.

4. The machine as claimed in claim 3, characterized in that the rotational measuring speed lies in the order of magnitude between one and 10% of the rotational operation speed.

5. The machine as claimed in any one of claims 1 to 4, wherein the tool (100) is a cup-shaped grinding disc which comprises a disc-shaped base (102) and a grinding layer (104) of which the front end surface presents the active face (106) of the tool (100), and the pivot axis (B) extends between the active face (106) and the base (102) when the grinding layer (104) is new.

6. The machine as claimed in any one of claims 1 to 4, wherein the tool (100) is a plate-shaped grinding disc which comprises a base (102) and a grinding layer (104) of which the front end surface presents the active face (106) of the tool (100), and the pivot axis (B) extends between the active face (106) and the base (102) when the grinding layer (104) is new.

* * * * *